United States Patent [19]

Kurahayashi et al.

[11] Patent Number: 4,719,514
[45] Date of Patent: Jan. 12, 1988

[54] METHOD AND APPARATUS FOR IMAGE TRANSMISSION

[75] Inventors: Sadasuke Kurahayashi, Niiza; Tsunehiro Watanabe, Tokyo; Masahiro Sakamoto, Tokyo; Yasuhide Ueno, Tokyo; Takeshi Ono, Yokohama; Shigeo Miura, Tokyo; Tsuneo Negi, Yokohama; Masatomo Takahashi, Tokyo, all of Japan

[73] Assignee: Canon Kabushiki Kaisha, Tokyo, Japan

[21] Appl. No.: 834,780

[22] Filed: Feb. 28, 1986

[30] Foreign Application Priority Data

Mar. 1, 1985 [JP] Japan ................................. 60-41408
Mar. 1, 1985 [JP] Japan ................................. 60-41409
Mar. 1, 1985 [JP] Japan ................................. 60-41410

[51] Int. Cl.$^4$ .............................................. H04N 1/419
[52] U.S. Cl. ...................................... 358/261; 358/280; 358/287

[58] Field of Search ............... 358/260, 261, 280, 257; 346/347 AD, 347 DD

[56] References Cited

U.S. PATENT DOCUMENTS 4,386,373 5/1983 Kondo et al. ...................... 358/260
4,586,088 4/1986 Kondo .................................. 358/260

Primary Examiner—Edward L. Coles, Sr.
Attorney, Agent, or Firm—Fitzpatrick, Cella, Harper & Scinto

[57] ABSTRACT

An image transmission method includes the steps of: obtaining an image signal by reading an original image; compression-encoding the obtained image signal; temporarily storing the encoded image data into a temporary storage memory; presuming the empty capacity of a buffer memory for temporarily storing the received image data at a receiving side; and transmitting the encoded image data in accordance with the presumed empty capacity.

17 Claims, 30 Drawing Figures

Fig. 8
|   | DT |   |   |   |   |   |   |
|---|---|---|---|---|---|---|---|
| A | φ 1 φ | φ | φ | φ | φ | φ |
| B | φ φ φ | φ | φ | φ | φ | φ |
| C | φ φ φ | φ | φ | φ | φ | φ |
| D | 1 | | | | | | |
Fig. 9
|   | DT |   |   |   |   |   |   |
|---|---|---|---|---|---|---|---|
| A | φ φ | φ | φ | φ | φ | φ | φ |
| B | φ φ | φ | φ | φ | φ | φ | φ |
| C | φ φ | φ | φ | φ | 1 | | |
Fig. 12
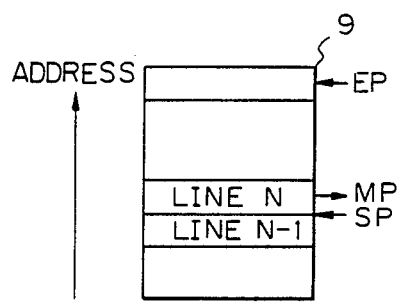
Fig. 13
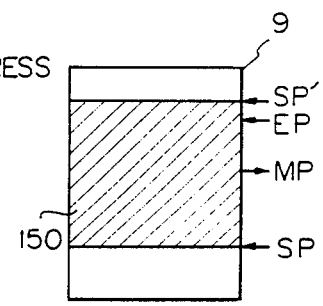

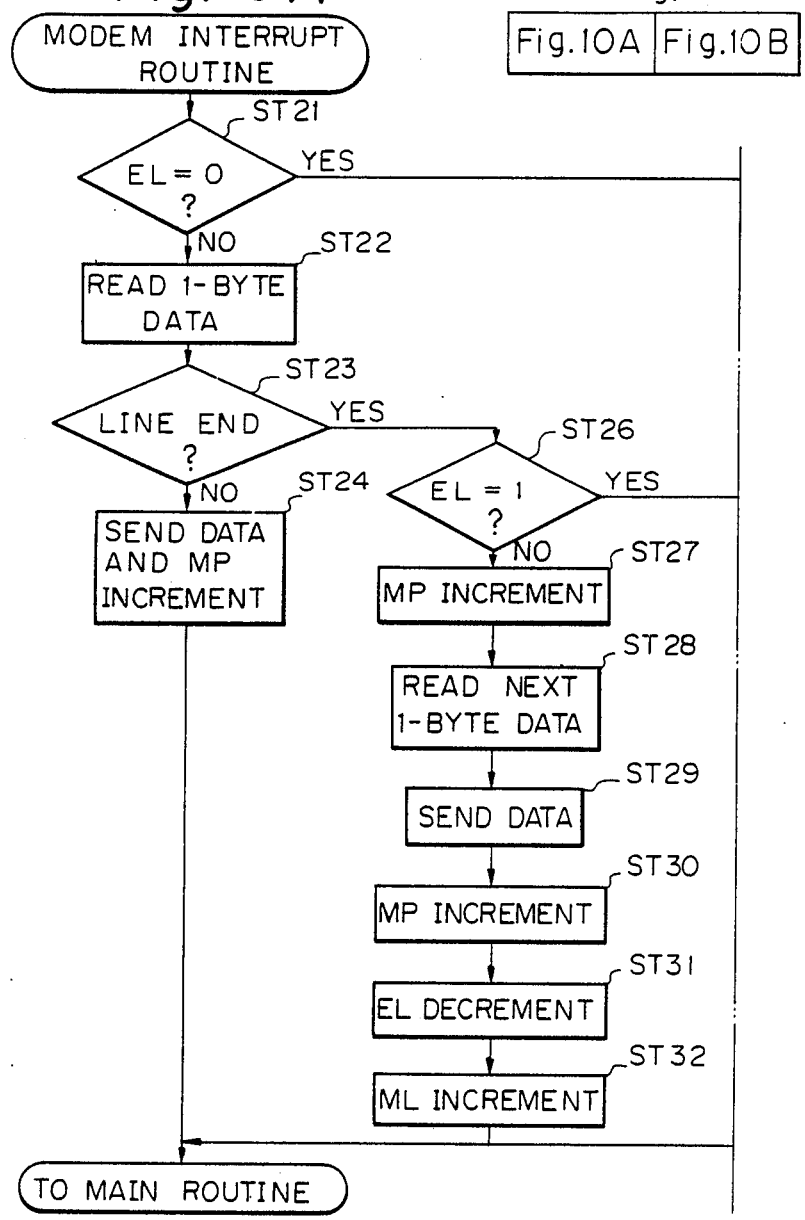

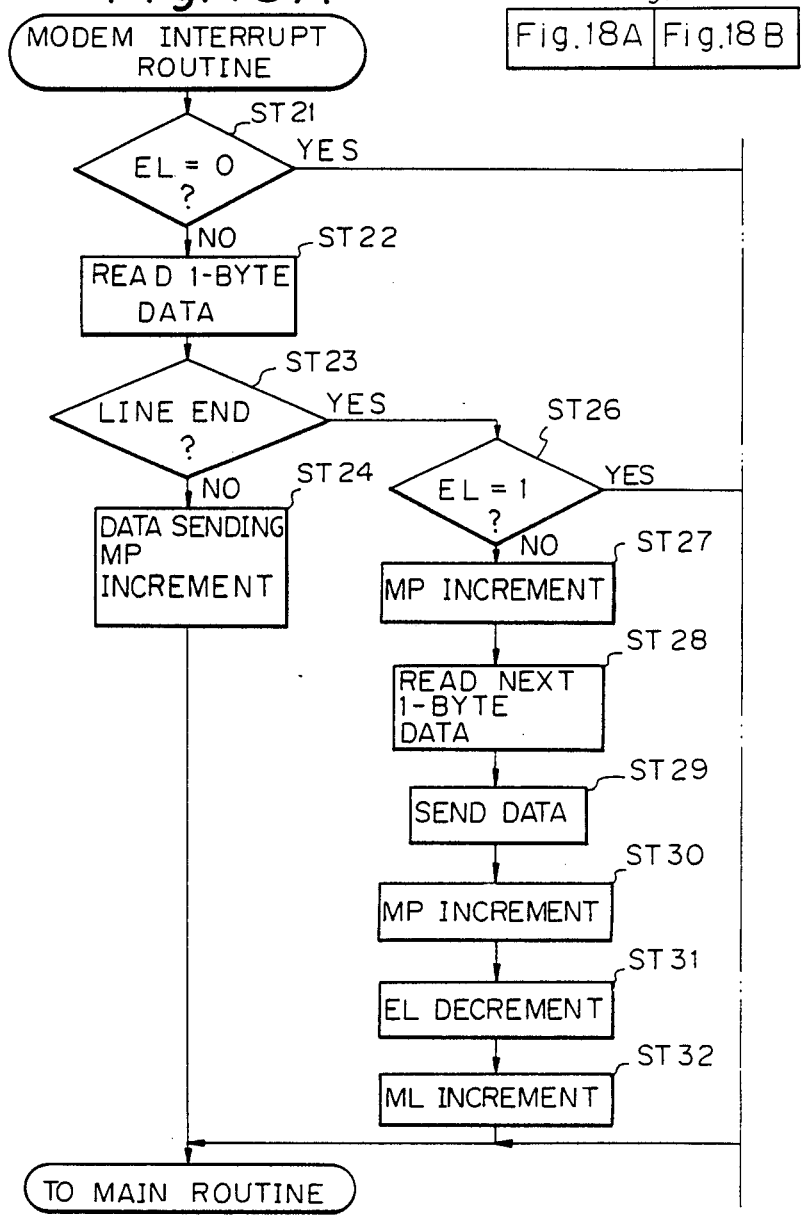

METHOD AND APPARATUS FOR IMAGE TRANSMISSION

BACKGROUND OF THE INVENTION

The present invention relates to a method and apparatus for image transmission wherein an original image is read to obtain an image signal which is compressed and encoded for image transmission.

A minimum transmission is set for the transmission and reception sides of a facsimile apparatus. The minimum transmission time is the time required for reading and encoding one line of an original document at the transmission side, and the time required for recording one line at the reception side. If one line image signal is transmitted within a time shorter than the minimum transmission time, then recording at the reception side cannot follow. Therefore, in a G-3 mode facsimile apparatus conforming with Recommendation T30 of CCITT, fill bits or dummy signals have been added as shown in FIG. 1A if the transmission time of encoded information for one line is shorter than the minimum transmission time.

Meanwhile, there has been proposed in U.S. patent application No. 672,783 (filed on Nov. 19, 1984) and commonly assigned herewith a transmission method shown as a fill-bit-less transmission mode wherein Fill bits are not added if the total transmission time for a plurality of lines is longer than the sum of the minimum transmission times for the same number of lines. By doing, so it is possible to reduce the amount of fill bits by A as shown in FIG. 1A to thereby shorten the transmission time.

The amount of fill bits in the Fill-bit-less mode is calculated as follows: The capacity of a reception buffer at the reception side for temporarily storing a received signal is first detected. The amount of data is accumulated each time one line of image data (i.e., data for one line, e.g., one scan line) is transmitted. When the accumulated amount of data exceeds the reception buffer capacity and if the accumulated amount of data is larger than the number of bits corresponding to the sum of the minimum transmission times for the same number of lines for the accumulated data, fill bits are not added. However, if the accumulated amount of data is smaller than the number of bits, fill bits corresponding in number to the difference therebetween are added to the one-line prior image data.

The accumulated amount of data and the reception buffer capacity have been compared heretofore as above. In this case, however, since the data in the reception buffer is being read and recorded during data transmission, an empty area is actually present within the reception buffer even if the accumulated amount of data exceeds the reception buffer capacity. That is, the reception buffer is not efficiently used.

It is desirable to efficiently use the buffer memory having a capacity as small as possible because the buffer memobory capacity is directly related to the cost of the apparatus.

Apart from the above, it has become possible to transmit a large amount of information within a shorter transmission line due to recent advance in communication technology. For example, it is possible to transmit information at 9600 bits/sec over a public telephone network. Therefore, the fact is that the reading and encoding speed cannot follow the transmission speed. This will be explained in more particular by taking as an example a facsimile apparatus. The amount of one line encoded information, all white, is 31 bits for MH code, including an EOL signal, and 15 bits for MR code, including an EOL signal. Therefore, the transmission time is 3.2 msec for MH code and 1.5 msec for MR code, respectively, at 9600 bits/sec.

Whereas if a charge storage type image sensor such as a CCD is used, the time required for reading and encoding one line is 5.0 msec including a storage (readout) time of 2.7 msec, data transfer time of 2.2 msec and encoding process time of 0.1 msec. Thus, an idle time of 1.8 msec for MH code and 3.5 msec for MR code becomes present. Conventionally, a dummy signal which is called a fill bit has been transmitted during the idle time until encoding is completed. This idle time becomes serious, especially for the area where the amount of encoded signal is small, e.g., the blank portion at the top of an original. The amount of fill bits is extremely large at the top of an original so that the transmission time becomes long.

Furthermore, after completion of transmitting one page image data, the transmission side conventionally continues to send a dummy signal or fill bits until the reception side completes the recording process, as shown in FIG. 1B. After sending fill bits, an RTC (Return to Control) signal is sent which indicates that control signals different in transmission speed from that of image data is sent. Upon reception of the RTC signal, the reception side changes the high speed modem for the reception of image data to the low speed modem for the reception of control signals. After sending the RTC signal, the transmission side sends a preamble signal after the lapse of a predetermined time stipulated in the T30 Recommendation of CCITT. Subsequently, a Q signal is sent. The Q signal indicates that the next page image signal will be sent after resetting the communication protocol, the next page image signal will be sent leaving the current communication protocol as it is, or all of the image signals have been sent.

As descrbied above, conventionally, control signals are sent after a certain time lapse after the recording process at the reception side. Therefore, it takes a fairly long time for the process between pages, resulting in a long transmission time for an original document with a large number of pages.

SUMMARY OF THE INVENTION

It is an object of the present invention to eliminate the above-noted disadvantages and provide a method and apparatus for image transmission capable of transmitting image data at high speed.

It is another object of the present invention to provide a method and apparatus for image transmission capable of efficiently using the buffer memory at a reception side.

It is a further object of the present invention to provide a method and apparatus for image transmission capable of shortening the transmission time by making the amount of dummy signals small irrespective of the amount of encoded signals.

It is a still further object of the present invention to provide a method and apparatus for image transmission capable of efficiently shortening the transmission time for an original document with a large number of pages by shortening the time required for the communication procedure between pages.

The above and other objects of the present invention will become apparent from the following detailed description with reference to the accompanying drawings.

BRIEF DESCRIPTION OF THE DRAWINGS

FIG. 7, comprising

FIGS. 8 and 9 show storage formats of EOLs in RAM 9;

FIG. 10, comprising FIGS. 10A and 10B, is a flow chart of the modem interrupt routine;

FIG. 12 is a diagram explaining quantization error of the simulation pointer SP;

FIG. 13 is a diagram explaining the buffer management where the reception buffer capacity is smaller than the transmission buffer capacity;

FIG. 18, comprising FIGS. 18A and 18B, is a flow chart of the modem interrupt routine of the embodiment of FIG. 17.

DETAILED DESCRIPTION OF THE PREFERRED EMBODIMENTS

An example of a facsimile apparatus embodying the present invention will now be described.

(Mechanical Construction)

Figure 2A:
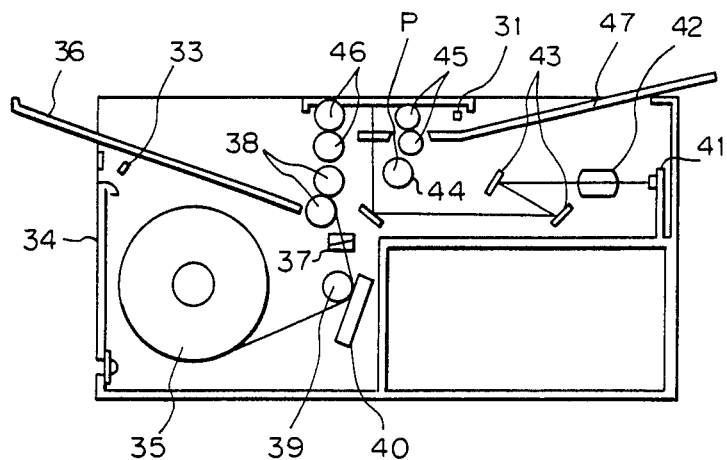
FIG. 2A is a sectional view of a facsimile apparatus showing an embodiment of the present invention.

Referring now to FIG. 2A showing a sectional view of the facsimile apparatus, reference numeral 41 denotes a CCD solid state line image sensor, numeral 42 stands for a focussing lens, 43 for mirrors, 44 for an original illuminating lamp, 45 for original feed rollers, 46 for original pickup rollers, and 47 for an original feed tray. Reference numeral 31 denotes an original detection sensor for detecting if an original is present on the original feed tray.

Reference numeral 34 denotes a roll paper housing cover, numeral 35 stands for roll paper, 36 for a pickup tray for an original and record paper, 37 for a cutter, 38 for roll paper pickup rollers, 39 for roll paper transportation rollers, 40 for a recording head, and 33 for a roll paper cover sensor for detecting the open/close state of the cover 34.

In reading an original and referring to FIG. 2A, an original on the original feed tray 47 is transported by means of the rollers 45 and 46. The original is applied with light from the lamp 44 at a read-out position P. The reflected light therefrom is focussed onto the image sensor 41 via the mirrors 43 and the lens 42. The image sensor 41 converts the image into electrical signals.

Conversely, in recording, a roll paper 35 is transported while squeezed between the roller 39 and the head 40 whereat the thermal roll paper 35 is formed with the image by means of the head 40. After recording one page, the roll paper 35 is cut with the cutter 37 and transported and picked up on the pickup tray 36 by means of the rollers 38.

(Basic Block Diagram)

Figure 2C:
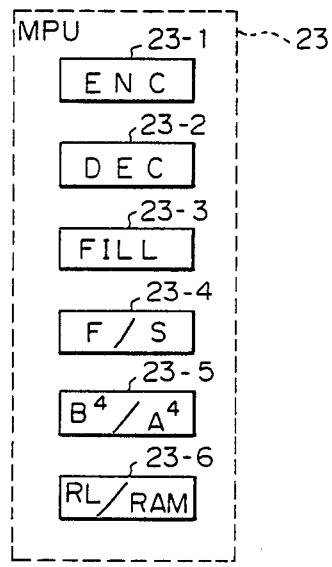
FIG. 2C shows a functional block diagram of MPU 23 shown in FIG. 2B.
Figure 2B:
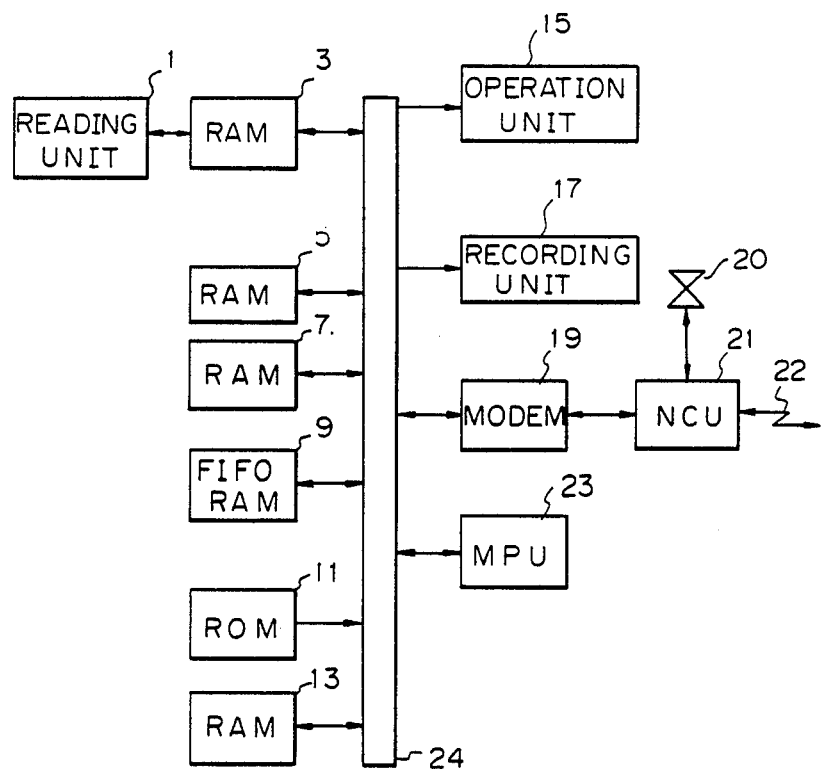
FIG. 2B is a fundamental block diagram for control of the facsimile apparatus of FIG. 2A.

FIG. 2B is a basic block diagram for control of the facsimile apparatus of the present embodiment. In the figure, a reading unit 1 reads out an original image and converts it into electrical image signals. Random access memories 3, 5 and 7 (hereinafter abbreviated as RAM) function to temporarily store such as image signals. A first-in and first-out RAM 9 (hereinafter abbreviated as FIFO RAM) stores encoded image signals. A read-only memory 11 (hereinafter as ROM) stores operation programs of MPU 23. RAM 13 stores flags, data and so on necessary for operation of MPU 23. An operation unit 15 includes input keys, displays and so on. A recording unit 17 records on a thermal paper a copy image, received image and management data. A modem 19 modulates transmitting data and demodulates received data. A network control unit 21 (hereinafter as NCU) controls to connect a communication line 22 either to the modem 19 or to a telephone 20. MPU 23 controls the whole system of the apparatus. In this embodiment, a microprocessor 8086 manufactured by Intel Corp. is used, which can make direct access to a 16-bit data bus 24 and a memory space up to the maximum 4 Megabytes.

MPU 23 has six fundamental functions, shown in FIG. 2C. Each of the functions will later be described with reference to the flow of image data.

(Transmission Operation)

Figure 3:
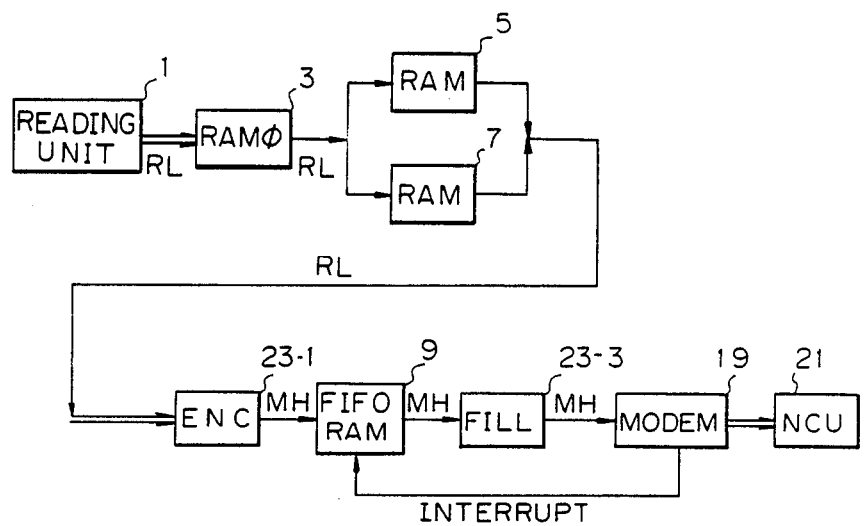
FIG. 3 is a block diagram showing the flow of image data during transmission in MH code.

The flow of image data during transmission operation will be described with reference to FIG. 3. In this example, transmission is performed using MH code.

One line image data read by the reading unit 1 upon reception of a read-out command from MPU 23, is converted in RL code and stored into RAM 3. Under control of MPU 23, data in RAM 3 is directly transferred to two line buffers RAM 5 and RAM 7 alternately for each line. RL codes read out of the two line buffers are encoded into MH code to be written in FIFO RAM 9. Under control of MPU 23, upon reception of a data request interrupt from the modem 19, MH code in FIFO RAM 9 is transferred to the modem one byte after another. At this time, fill bits are inserted if necessary. Insertion of fill bits will later be described in detail. One byte data transferred from FIFO RAM 9 to the modem 19 is transmitted to the reception side over a telephone network via NCU 21.

In the figure, all of the data transfer are performed via the bus 24 of MPU 23 except for the transfer from the read-out unit 1 to RAM 3 and from the modem 19 to NCU 21.

The interval of data request interrupts from the modem 19 varies with the transfer rate. Since data transfer is effected in unit of bytes, an interrupt occurs every $8/9600 = 0.83 \times 10^{-3}$ sec, in the case of 9600 bps, for example.

At the end of data transfer from RAM 3 to RAM 5 and RAM 7, MPU 23 outputs a read-out command to the reading unit 1. While MPU 23 performs an encoding process ENC and interrupt process, the reading unit 1 reads an original, and raw data is converted into RL data.

(Reception Operation)

Figure 4:
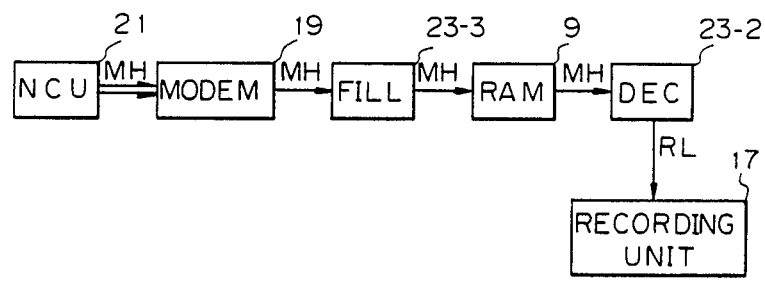
FIG. 4 is a block diagram showing the flow of image data during reception in MH code.

The reception operation using MH code will be described with reference to FIG. 4. When MH code is received under control of MPU 23 from the network via NCU 21 and modem 19, fill bits are first deleted and transferred in the form of MH code into MPU 23. RAM 9 fetches MH code from RAM 9 and converts it into RL code to transfer it to the recording unit 17 for recording.

(Management of FIFO RAM 9)

A management method for FIFO RAM 9 during transmission will now be described. To manage FIFO RAM 9, three address pointers are used in this embodiment.

The first pointer is called an encode pointer EP which indicates the last storage address of encoded data. EP, is incremented by one byte. The increment is managed under the main routine which will be described later and is executed every time one byte data is encoded.

The second pointer is called a modem pointer MP, which indicates the last storage address of encoded data already transferred to the modem 19 at a modem interrupt. MP is managed under the modem interrupt routine, which will be described later. MP is incremented by one byte since one byte data is transferred every time an interrupt is effected.

The third pointed is called a simulation pointer SP, which indicates the last storage address of encoded data already recorded at the reception side and is incremented by one line data. The increment is executed at each minimum transmission time at the reception side to advance to the storage address of the next EOL signal. SP is managed under the timer interrupt routine to be described later.

The minimum transmission time at the reception side is informed to the tranmission side using the procedure signal to be exchanged prior to image data transmission.

Figures 5A, 5B:
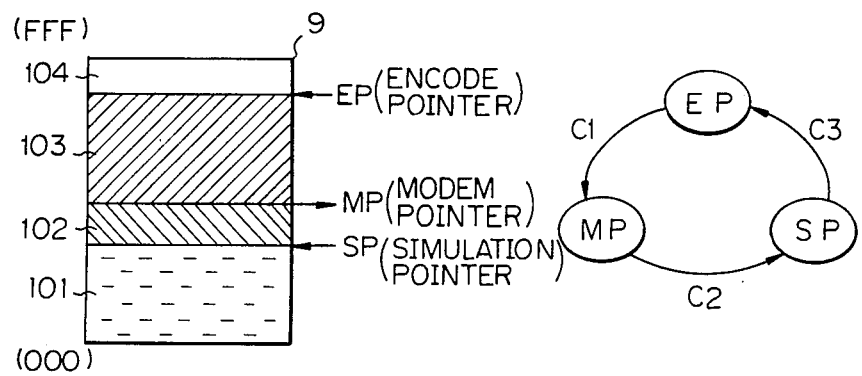
FIGS. 5A and 5B show the positional relationship between pointers EP, MP and SP for buffer management of the embodiment.

The relationship between pointers EP, MP and SP is shown in FIGS. 5A and 5B. In FIG. 5A, the uppermost address is (000) and the lowermost address is (FFF). The pointers EP, MP and SP count up from the lower address to the uppermost address, and again start counting up from the lowermost address. An area 101 stores such data as has already been encoded and transmitted, and recorded at the reception side. Therefore, the data in the area 101 is no longer necessary.

An area 102 stores such data as has already been encoded and transferred to the modem 19 but not recorded at the reception side. Therefore, the data is either being transmitted to the reception side or is stored in the buffer of the reception side. The data in the area 102 is therefore no longer necessary.

An area 103 stores such data as has only been encoded and has still not been transferred to the modem 19.

An area 104 is still not filled with encoded data.

The pointers EP, MP and SP must satisfy the following conditions C1 to C3.

C1 . . . MP cannot pass EP. When MP reaches EP, only encoding is performed while transmitting fill bits, and image data transmission is stopped.

C2 . . . SP cannot pass MP. Since the reception side cannot record data not yet transmitted, SP is stopped when it reaches MP.

C3 . . . EP cannot pass SP. After EP reaches the uppermost address (FFF) and while encoded data is accumulated again from the lowermost address, if EP passes SP, the data in area 102 is overwritten so that the count address of SP becomes unknown. Therefore, when EP reaches SP, the encoding process is temporarily stopped.

FIFO RAM 9 is managed so as to satisfy the above three conditions.

Examples shown in FIGS. 6A, 6B and 6C will be explained where three pointers EP, MP and SP are superposed one upon another.

Figures 6A, 6B, 6C:
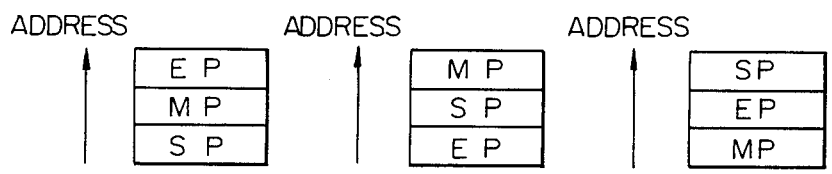
FIGS. 6A, 6B and 6C show examples of the pointers EP, MP and SP superposed one upon another.

The case shown in FIG. 6A occurs when a fairly long time is required for encoding because of a complicated pattern of an original. In this case, the modem 19 waits until encoded data is collected while transmitting fill bits. In this case, the reception side also waits for the next line data.

The case shown in FIG. 6B occurs when encoding, aw well as processes at the reception side too rapid for the transmission to follow. In this case, the transmission side, stops its reading and encoding and waits for the transmission process. The reception side also waits for the next line data.

The case shown in FIG. 6C occurs when encoding and transmission are too rapid for the processes at the reception side to follow. In this case, the transmission side stops its encoding and transmission until the reception side processes are completed. In practice, EP is allowed to pass SP. However, encoding is stopped for the reasons described in the condition C3.

The control operation of MPU 23 for realizing the management method of FIFO RAM 9 described above will be explained in the following.

(Main Routine)

Figure 7A:
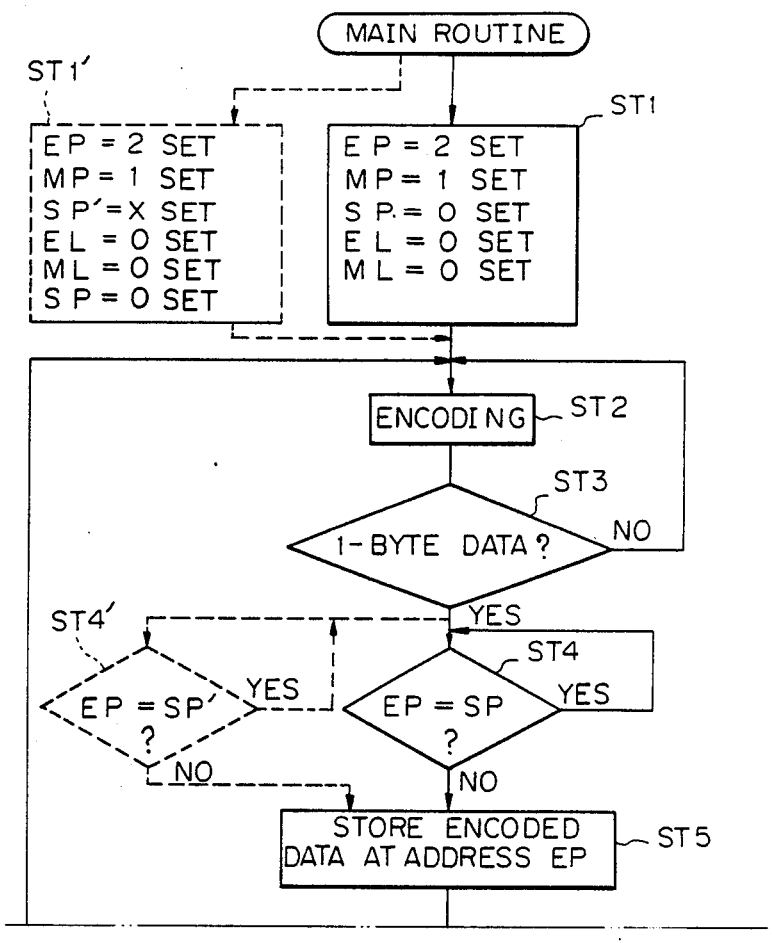
FIGS. 7A and 7B, is a flow chart of the main routine.
Figure 7B:
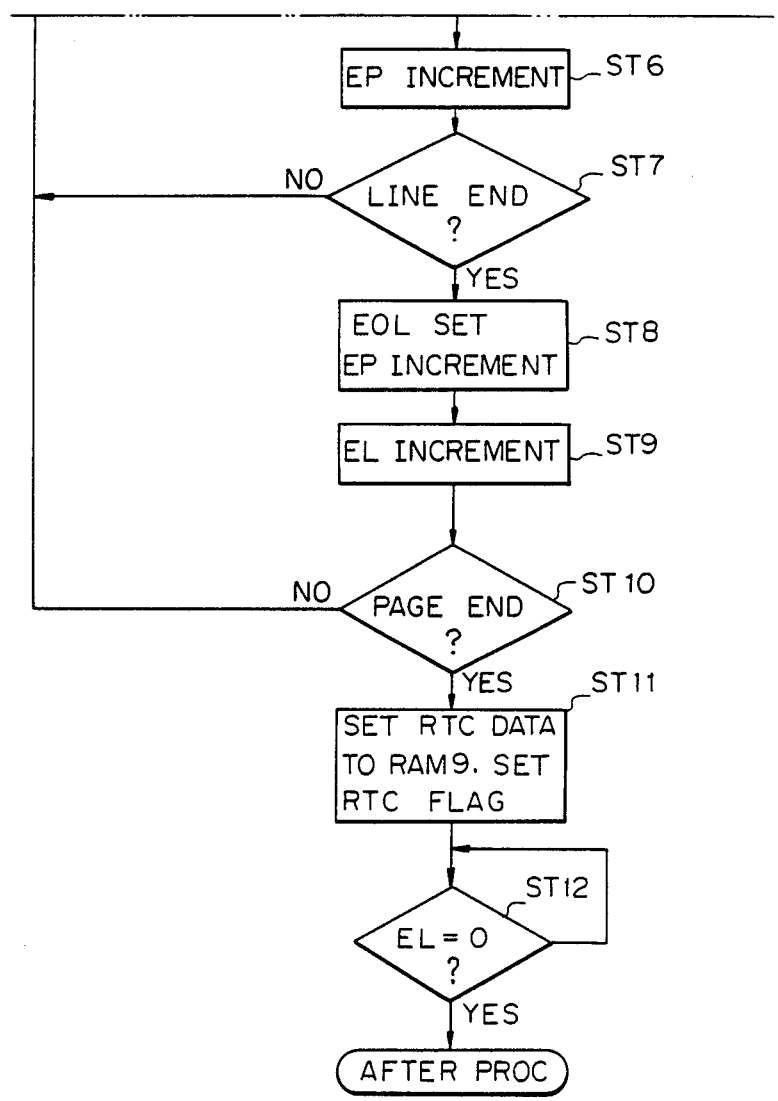

The control flow chart of the main routine is shown in FIG. 7.

First, at step ST1 initialization is carried out. At this step, EL indicates the number of EOL signals in the area 103 shown in FIG. 5a, i.e., the number of encoded lines still not transmitted. ML indicates the number of EOL signals in the area 102, i.e., the number of lines still not processed at the reception side.

After initialization, encoding starts at ST2. When one byte data is collected at ST3, it is judged at ST4 if EP and SP are equal to each other. If EP equals SP, encoding and storage of encoded data is stopped since as described with the condition C3 EP cannot pass SP. If EP is not equal to SP, one byte of encoded data is stored at ST 5 in RAM 9 at the address EP. Thereafter, EP is incremented (SP6). Steps ST2 to ST6 are repeated until one line encoding is completed. At St7, if a line end is detected, the EOL signal is stored in RAM 9.

The format of an EOL signal to be stored in RAM 9 will be described.

The EOL to be transmitted is constructed of consecutive 11 "0s" and a single "1". Each time MPU 23 detects one line end, it adds EOL to image data and transmit them together. In adding EOL, calculation of a transmission time required for transmitting one line data is carried out. If the calculated transmission time is shorter than the minimum transmission time, fill bits are inserted prior to addition of EOL. Therefore, how EOL is detected during reading RAM 9 becomes important. In the present apparatus, the following methods are employed for simplifying EOL detection during reading RAM 9 and EOL delivery.

Three basic concepts for handling EOL are:

(1) Addition of EOL is effected at the time of writing into RAM 9.

(2) Detection of EOL during reading RAM 9 is achieved by way of 2 byte consecutive 0s.

(3) During delivery of data in RAM 9, the second byte 0s among 2 byte condecutive 0s are not delivered. The description will proceed taking the following two exemplary cases in consideration.

The arrangement of data and EOL stored in RAM 9 is shown in FIG. 8 wherein data "1" in one line is present in the last byte. In the figure, image data of the last byte A is represented by DT. 0s are filled in after data DT in the byte A. Bytes B and C are all filled in with 0s, and 1 is inserted D byte. The number of 0s to be inserted before 1 in D byte is decided as in the following Table, depending on the number of 0s inserted in A byte.

| Number of 0s inserted in A byte | 0 | 1 | 2 | 3 or more |
|---|---|---|---|---|
| Number of 0s added before 1 of D byte | 3 | 2 | 1 | 0 |
| Number of 0s when B or C byte is deleted | 11 | 11 | 11 | 11 or more |

As seen from the foregoing, 11 0s can be guaranteed even one byte 0s of EOL in RAM 9 are deleted during delivery of EOL.

Next, the arrangement of image data and EOL stored in RAM 9 is shown in FIG. 9 wherein data "1" in one line is not present in the last byte. As shown in the figure, if data DT included in the last byte A are all 0s, the remainder of byte A is filled in with 0s. Byte B is also filled in with 0s. After 0s are inserted in byte C, 1 is inserted, the number of 0s being a subtraction result of 11 by the number of 0s inserted in byte A.

| Number of 0s inserted in A byte | 7 | 6 | 5 |
|---|---|---|---|
| Number of 0s inserted in C byte | 4 | 5 | 6 |

Since MH code has no more than the last 4 consecutive 0s, MH code with less than 4 0s inserted in A byte is not taken into consideration.

In case of a white line skip transfer, as a discrimination criteria for all white, the second byte "0s" are set as "01" (hexadecimal) for all white data in one line.

FIFO RAM 9 is written in the above-noted format. Therefore, in reading (during modem interrupt process) RAM 9, EOL detection is readily achieved by way of 2 byte consecutive 0s or one byte 0s and "0138 (hexadecimal). Furthermore, during deliver or reading data, EOL delivery is readily performed by deleting the second byte 0s (or "01"). Although EOL delivery is possible without deletion of the second byte 0s, deletion avoids delivery of unnecessary data to thereby result in a short transmission time. The main routine will again be described with reference to FIG. 7.

At step ST8, EOL is set and simultaneously therewith EP is incremented by the number of bytes of EOLs. Since one line encoded data has been stored, EL is incremented at ST9. The operations from ST2 to ST9 are repeated until transmission of one page image data is completed. After the completion of storage of one page image data is detected a ST10, ST11 follows to set RTC data in RAM 9 and set at RAM 13 an RTC flag indicating that transmission of RTC is possible. Thereafter, at ST12 it is judged if EL=0, i.e., if one page data has been transmitted and the operation is terminated.

(Modem Interrupt Routine)

The modem interrupt routine will be described with reference to FIG. 10. The modem 19 delivers an interrupt signal each time one byte data is transmitted. The main routine by which an interrupt signal is generated is temporarily stopped to enter into the modem interrupt routine.

At ST21, it is judged if EL=0, i.e., if there is any encoded data still not transmitted. If there is encoded data still not transmitted, then at ST22 one byte data is read from RAM 9 at address MP. At ST 23, it is judged if the data is the second byte "0000 0000" among the consecutive two bytes. In case of the second byte being "0000 0000", obviously it is the line end so that step ST26 follows thereafter. If it is not a line end, then at ST24 the data is transmitted to the reception side via NCU and MP is incremented to return to the main routine.

Upon detection of the second byte "0000 0000" at ST23, it is judged at ST26 if the number of encoded lines still not transmitted is 1 or not. If the number is 2 or more, MP is incremented at ST27, and without transmitting the second byte "0000 0000" the next one byte data is read at ST28 which is transmitted at ST29. At ST30, MP is again incremented. Since transmission of one line data is completed, EL is decremented at ST31 and ML is incremented at ST32, to return to the main routine. On the other hand, if EL=1 at ST26, it means that MP reached EP, which indicates that encoding is still under way after transmission or that the last line is now being transmitted after encoding of all lines is completed. It is judged at ST33 if the number ML of lines still not processed at the reception side is 0 or not. If there is any data still not processed, fill bets are sent during that time. Also, in case that ML=0 and an RTC flag is not set, fill bits are sent at ST37 since the last line is not still transmitted. If ML=0 and an RTC flag is set, it means that all lines have been recorded at the reception side. Therefore, EL is set at 0 and the first data of the RTC signal, which indicates that transmission of one page data to the receiving side is completed, is sent to thereafter return to the main routine.

If EL=0 at ST21, the RTC flag is checked. If the RTC flag is set, then the remaining RTC data is sent to thereafter return to the main routine. Whereas is the RTC flag is not set, fill bits are sent before returning to the main routine since all data is not still transmitted.

(Timer Interrupt Routine)

Figure 11:
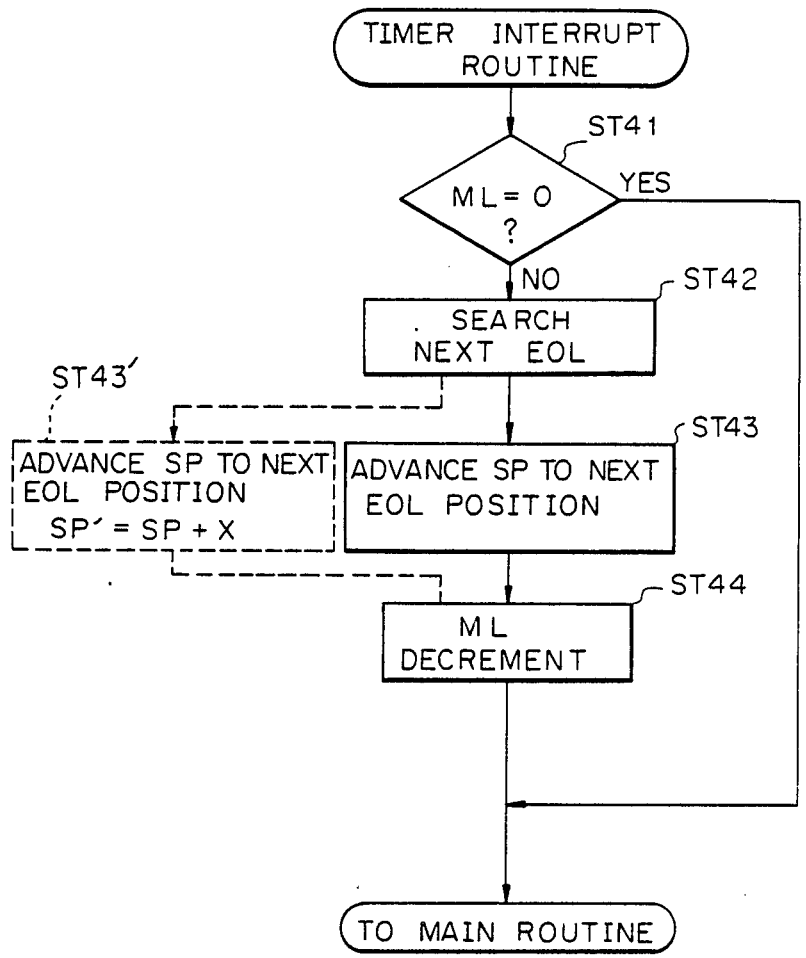
FIG. 11 is a flow chart of the timer interrupt routine.

Referring now to FIG. 11, the management of a simulation pointer under the timer interrupt routine will be described. The timer interrupt routine is effected in response to a timer signal generated at intervals of the minimum transmission time at the reception side. First, at ST41 it is checked if the number ML of lines still not processed at the reception side is 0 or not. If ML is 0, which means that the reception side waits for data from the transmission side, the main routine continues. If ML is not 0, it is judged that one line record is completed at that time. The storage address next to the current EOL storage address at the pointer SP is searched (ST42). Thereafter, at ST43 the next EOL storage addres is used as SP. Further, at ST44 ML is decremented by 1 to return to the main routine.

It is noted that quantization error may occur since the simulation pointer is presumedly determined at the transmission side. For instance, if lines continue whose one-line image data transmission time is longer than the minimum transmission time at the reception side, the positional arrangement of pointers becomes as shown in FIG. 12. In the figure, SP is located at the end of line N—1, while MP is located at the middle of line N. In this case, even if a timer interruption is effected, SP is not incremented because ML=0. Also, even if transmission of line N is completed after 1 msec from the timer interrupt, since SP is not incremented before the next interrupt (e.g., generated at 5 msec intervals), SP is delayed by 5−1=4 msec from the actual process at the reception side. Such quantization error however has the nature of a delay and never has the nature of an advance, so that lack of data will not be generated.

(Larger Buffer Capacity at the Reception Side than at the Transmission Side)

The buffer management so far has been described on the assumption that the buffer capacity at the reception side is larger than at the transmission side. If the buffer capacity at the reception side is larger than at the transmission side, the foregoing description may also be applicable. The reason for this is that the amount of data still not processed at the reception side never exceeds the transmission buffer capacity in the above-described buffer management.

However, if the buffer capacity at the reception side is smaller than at the transmission side, it is necessary to control in such a way that the amount of data still not processed at the reception side, i.e., the amount of data between pointers MP and SP, does not exceed the reception side buffer capacity.

To this end, a pointer is additionally provided as shown in FIG. 13. This pointer is called a simulation upper limit pointer SP40 . SP' is always located in advance of the simulation pointer SP by 150 in the reception side buffer capacity. In addition, EP is controlled so as not to pass SP'. MP cannot pass EP as described previously. Therefore, MP cannot pass SP' so that the buffer capacity between MP and SP always becomes smaller than that of the reception side buffer capacity thereby preventing an overflow of the reception buffer.

The flow chart for conducting such process may be realized by modifying a part of the main routine of FIG. 7 and the timer interrupt routine of FIG. 11. In the main routine, step SP1' is carried out instead of step ST1. At ST1', instead of setting SP at 0, the amount X of the storage bytes of the reception side buffer is set at SP'. it is judged at ST4' if EP=SP'. If EP equals SP', encoding is terminated. The other processes are the same as described with the main routine. The modem interrupt routine is the same as described previously and needs not be modified.

In the timer interrupt routine, ST43' is carried out instead of ST43. At ST43', SP is advanced to the next EOL storage address and X is added to SP to obtain SP'.

As seen from the foregoing, detailed description of the embodiment, the amount of image data to be processed at the reception side is assumed by using the minimum transmission time informed prior to data transmission, and disregarding the actual buffer capacity at the reception side. The amount of data already transmitted to but still not processed at the reception side is controlled so as not to exceed the buffer memory capacity at the reception side.

Therefore, there is no overflow of the reception side buffer. Further, it is possible to efficiently use the empty area at the reception side buffer where data has already been processed. Furthermore, on the transmission side, it is possible to extremely reduce the number of sendings of fill bits and the amount of fill bits after transmission of image data is stopped.

As a result, a high speed image transmission with a small buffer capacity is possible. In addition, reduction in number of interruption of reading and recording contributes to the image reading and recording quality.

In the above embodiment, the minimum transmission time at the reception side has been assumed as constant. In case that the minimum transmission times differ between the case of all white pixels for one line and the case partially including black pixels, it is possible to embody the present invention by changing the interval of the timer interrupt in accordance with image data.

(Start Timings of Encoding and Reading)

Figure 14:
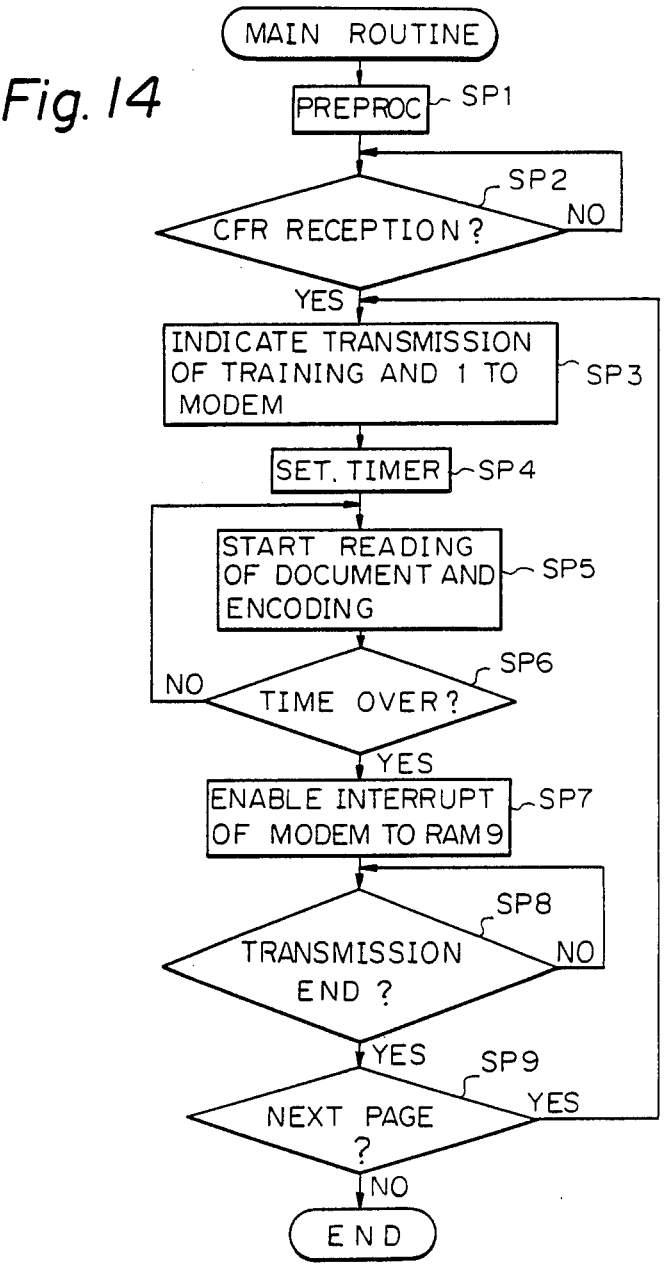
FIG. 14 is a flow chart explaining the start timings of encoding and reading.
Figure 15:
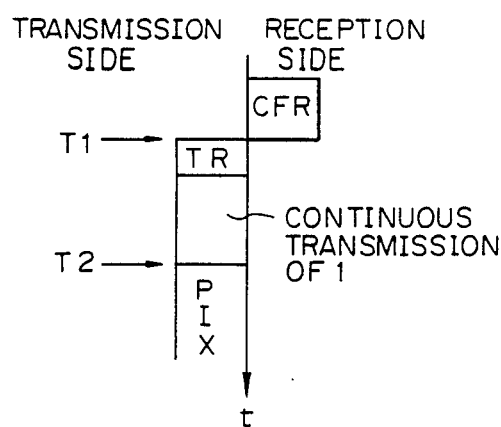
FIGS. 15 and 16 are diagrams time-sequentially showing the start timings of encoding and reading.

Start timings of recording and reading will now be described with reference to the flow chart of FIG. 14.

A pre-procedure is performed at step SP1. The pre-procedure includes calling to the reception side and sending various digital control signals to the reception side. After completion of a reception preparation at the reception side and after reception of a CFR signal indicating such a state, the transmission side instructs to send to the modem 19 a training signal and consecutive "1's" during the period SP3 to SP5 and simultaneously therewith the timer is set. At this time instant T1, the transmission side is also instructed to initiate reading an original and encoding. The timer is used in setting the time when sending of consecutive "1's" is stopped. Until the timer counts up, sending of consecutive "1's" continues to set the reception side at a reception state. During this period, reading and encoding are carried out to store end encoded image data of the top portion of an original in FIFO RAM 9. At the time instant T2 when the timer counts up, sending of consecutive "1's" to the modem 19 from MPU 23 is stopped, to enable an interrupt of RAM 9 from the modem 19. Thus, reading of image data stored in RAM 9 becomes possible. Therefore, starting from the time instant T2 image data PIX is transmitted to the reception side. Since image data has already been stored to some extent as of the time instant T2 in RAM 9, there is no possibility of reading and encoding not following the transmission speed, even if a not-printed portion is present at the top of an original.

After completion of one page transmission at SP8, it is checked at SP9 if the next page is present or not. In case of presence, SP3 resumes to perform similar operations. Alternatively, in case of absence, the transmission operation is completed.

As described in the foregoing, while sending a training signal and consecutive "1's", reading and encoding are performed and the encoded data is stored in RAM 9. Therefore, at the start of sending image data, there occurs no such case where encoding is still under operation even at the time of image data transmission. Further, reduction in amount of the dummy signal or fill bits enables to shorten the overall transmission time.

Although reading and encoding have been effected after detection of a CFR signal in the present embodiment, it is also possible to start them prior to detection of a CFR signal.

Figure 16:
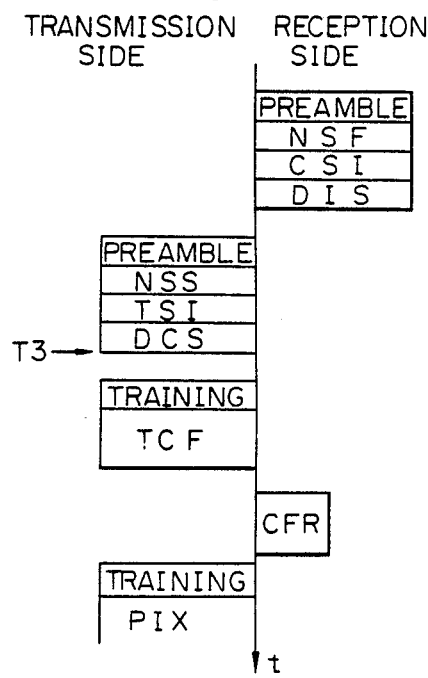

For instance, as shown in FIG. 16, after the type of the reception side is discriminated by such as NSF, CSI or DIS and the transmission mode is determined on the transmission side at the timing T3, reading and encoding may be started.

By doing so, selection of compression and encoding methods for the image signal is completed, so that readout signal may be stored in FIFO RAM in the form suitable for the reception side mode.

The above NSF (Non-Standard Facilities) signal indicates that the reception side has functions other than the standard one. The CSI (Called Station Identification) signal indicates the telephone number of the called party. The DIS (Digitial Identification Signal) indicates that the called party has a facsimile conforming with CCITT specification.

NSS, TSI and DCS are signals to be sent from the transmission side. The NSS (Non-Standard Facilities Setup) signal indicates that transmission is carried out with a non-standard function in response to the NSF signal. The TSI (Transmission Subscriber Identification) signal indicates the telephone number of the tranmission side. The DCS (Digital Command Signal) is a signal responding to the CCITT function discriminated by the DIS.

Figure 17A:
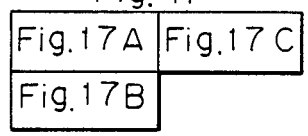
FIGS. 17A, 17B and 17C, is a flow chart of the main routine according to another embodiment.
Figure 17:
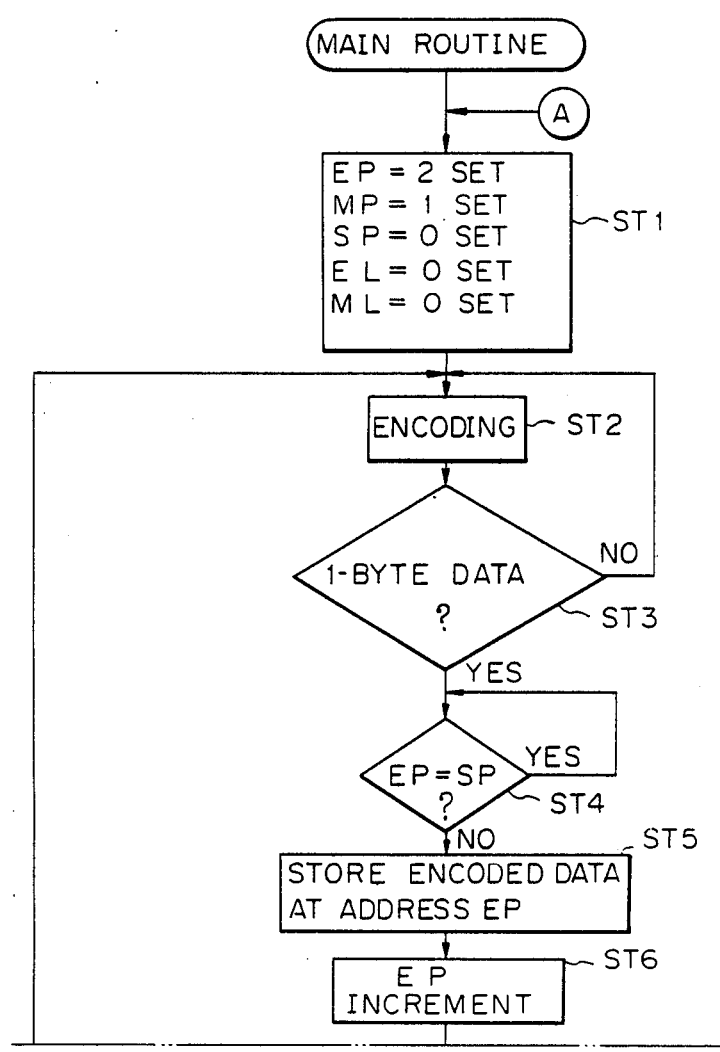
FIG. 17, comprising
Figure 17B:
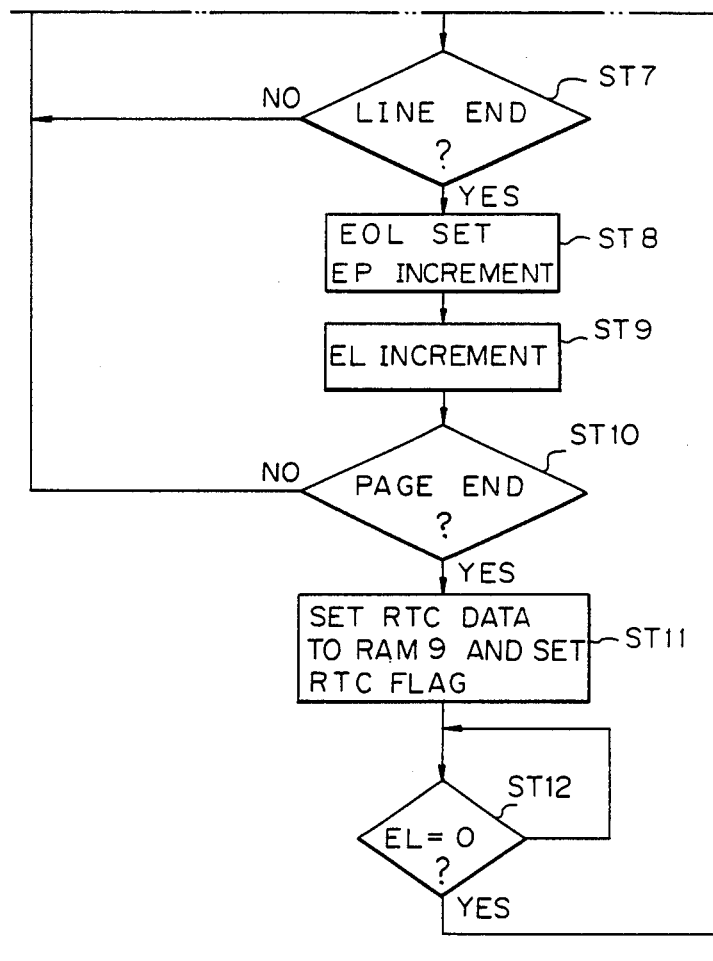
Figure 17C:
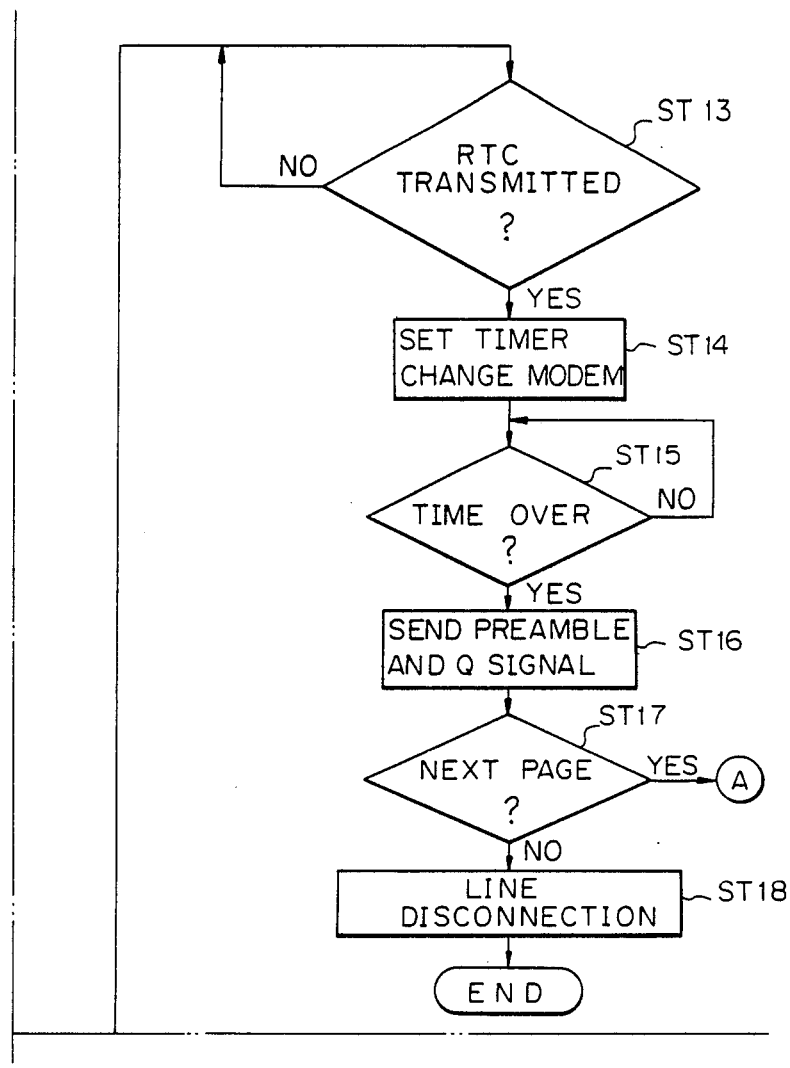
Figure 18B:
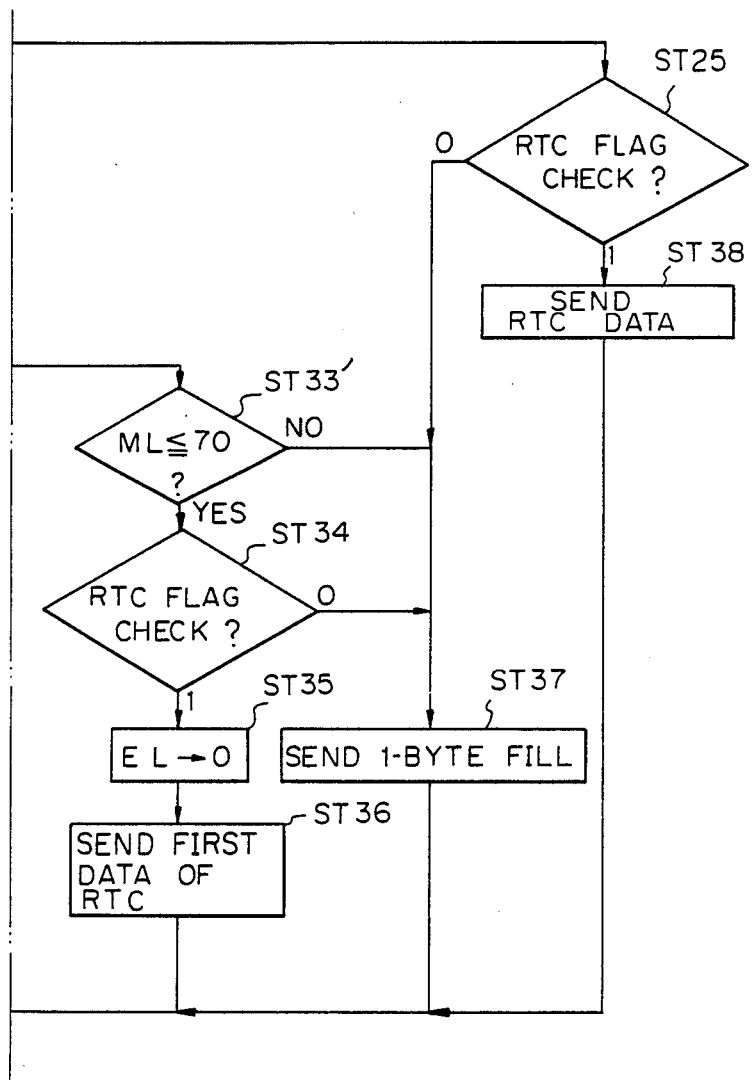

Another example of the processes after ST12 of FIG. 7 will be described with reference to FIG. 17. In this example, an RTC signal is sent prior to completion of the recording process at the reception side. The processes from ST1 to ST12 in FIG. 17 are the same as in FIG. 7. At ST12, it is judged if the RTC signal set in RAM 9 at ST11 is already sent or not. If the RTC signal is already sent, the timer is set at ST14 and the modem is changed from the image data modem to the low speed control signal modem. After the lapse of 75±20 msec from the time when the RTC signal is sent, a preamble signal is sent for 1 sec at ST16 and succeedingly a Q signal is sent. The Q signal indicates whether the next page is present or not and whether the communication protocol is to be changed in the case of presence of the next page. If the page is present after sending of the Q signal is completed, ST1 resumes. In case sending of all pages is completed, the network is made in an on-hook state to terminated the operation.

Figure 10B:
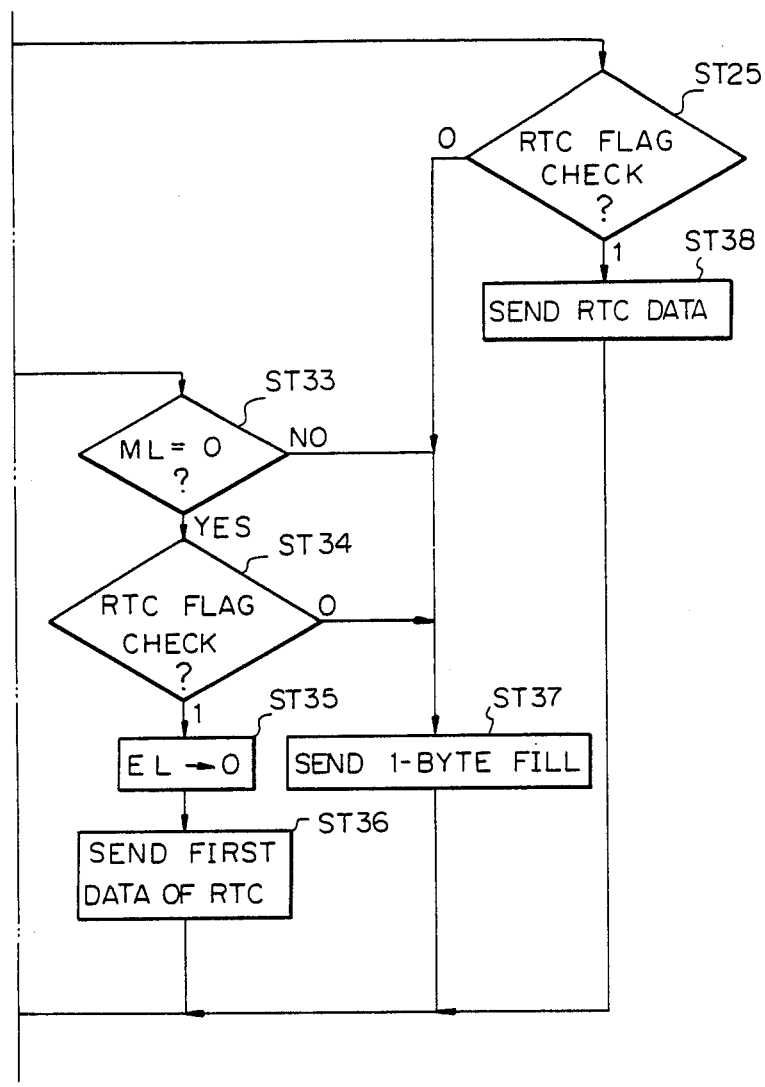

The modem interrupt routine is almost the same as in FIG. 10 except that at ST33' instead of ST33 it is checked if the number ML of lines not still processed at the reception side is 70 or less. If the number ML of lines still not processed exceeds 70, fill bits are sent at ST37. In case ML is 70 or less, then an RTC flag is checked. If the RTC flag is not set and ML is 70 or less, the last page is not still so that fill bits are sent before the main routine is resumed.

If the RTC flag is set and ML is 70 or less, EL is set at 0 and the first data of the RTC signal is sent to return to the main routine even if all lines are not still processed at the reception side.

Figure 1A:
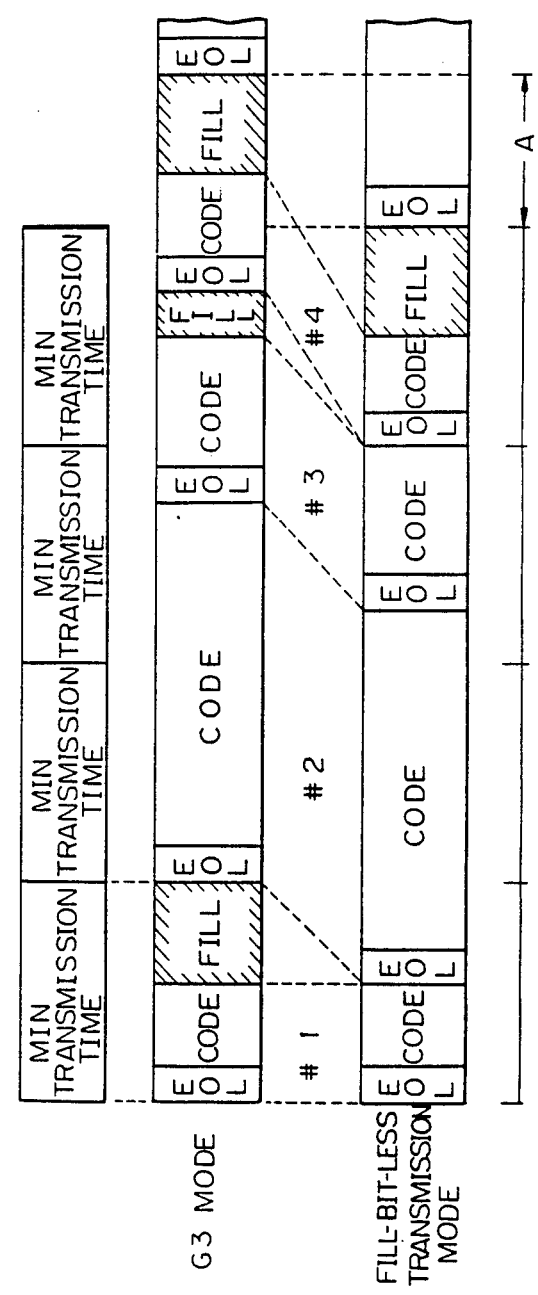
FIG. 1A is a diagram explaining a previously proposed G-3 mode and Fill-bit-less mode transmission methods.
Figure 1B:
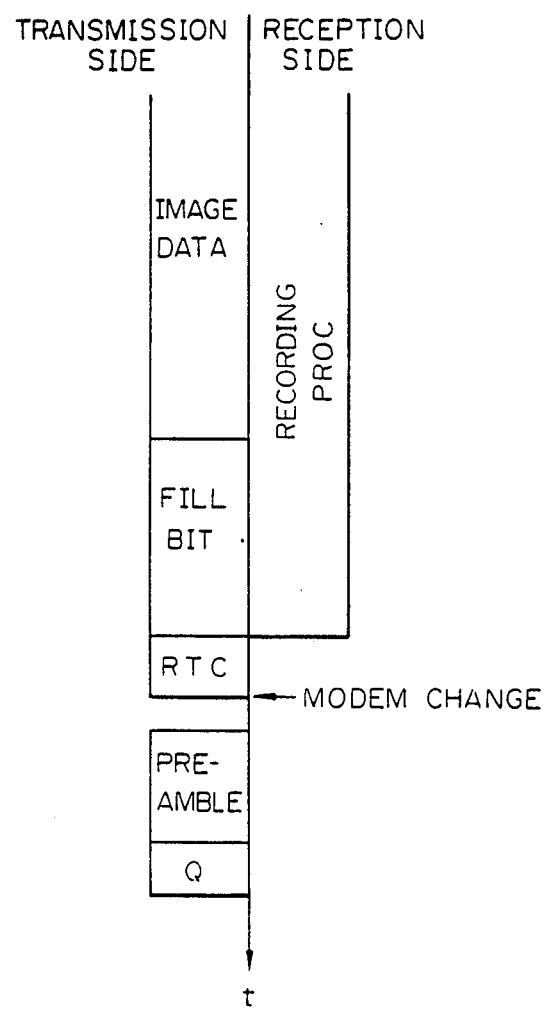
FIG. 1B is a diagram time-sequentially showing those processes performed when one page image data transmission is to be completed.

The reason for this is that, as already described with FIG. 1B, conventionally the RTC signal is sent after completion of the recording process at the reception side, so that sending of the succeeding Q signal is delayed and a long time is required for performing the procedure between pages.

In view of the above, the RTC signal is first sent in the present embodiment, taking into consideration of the amount of data to be processed at the reception side, during the preset time period (75±20 msec according to CCITT, the T30 Recommendation) from sending an RTC signal to sending a Q signal, and the preset preamble signal time period (1 set±15% according to the same Recommendation). In this embodiment, assuming that the process time for one line at the reception side is 10 msec, the RTC signal is sent at the time 700 msec (70×10 msec) before the end of recording process at the reception side.

Therefore, the reception side can detect the preamble signal at least for 205 msec (850+55)−700=205 msec. The time period of 205 msec is sufficient for the reception side to receive the preamble signal and the succeeding Q signal.

Figure 19:
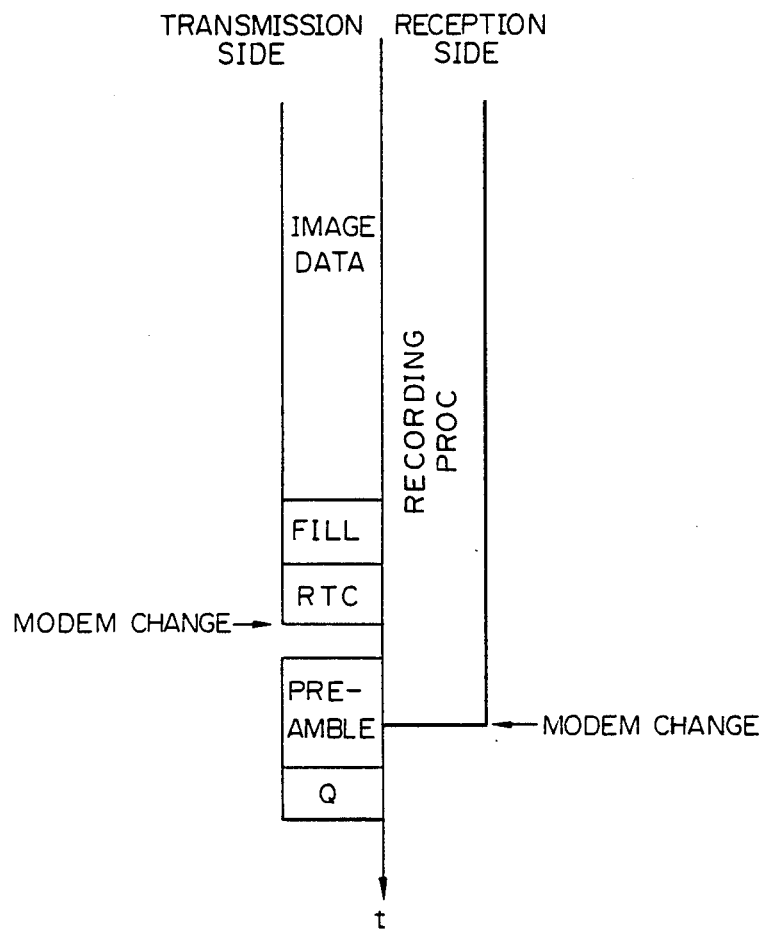
FIG. 19 is a time-sequential diagram showing the Q sending time of the embodiment shown in FIGS. 17 and 18.

FIG. 19 particularly shows such performance. The transmission side changes the modem to the control signal side after sending the RTC signal is previously described with the main routine. On the other hand, the reception side detects the RTC signal substantially at the same time when the recording process is completed to accordingly change the modem.

Thus, it is possible to reduce the amount of fill bits to a large extent. The RTC signal is sent when ML is 70 or less in this embodiment. It is to be noted however that the number ML varies with the minimum transmission time at the reception side.

The management of the simulation pointer under the timer interrupt routine is the same as with FIG. 11.

As seen from the foregoing, the image transmission method of the present invention presumedly determines based on the process speed at the receiving side, the empty capacity of the receiving side buffer temporarily storing the received image signal, and a dummy signal proportionate in amount to the presumed empty capacity is added to the encoded image signal for transmission.

The image transmission apparatus of the present invention comprises decision means for deciding the amount of data already transmitted by transmission means but still not processed at the receiving side by presuming the processed amount of encoded data at the receiving side, and control means for controlling said transmission means in such a way that the amount of data still not processed becomes in excess of the memory capacity of the receiving side buffer.

When the construction as above, it is apparent that the receiving side buffer does not overflow. Further, it is possible to efficiently use not only the empty area of the reception side buffer still not used but also the empty area where data has already been processed. In addition, on the transmission side, the number of interrupts of image transmission is greatly reduced. Thus, a high speed image transmission is possible.

Furthermore, as the number of interrupts of image transmission reduces, the number of interrupts of reading an original image reduces correspondingly in the case of a relatively small capacity of the storage device at the transmission side. Therefore, degradation in quality of a readout image can be prevented which might be caused by a temporary interrupt of reading and its restart.

According to the present invention, reading and encoding start prior to reception of a preprocedure confirmation signal from the receiving side or while sending a training signal to the receiving side after reception of the pre-procedure confirmation signal. Therefore, there occurs no such a case as reading and encoding for transmission of image data being unable to follow the transmission speed. Thus, it is possible to reduce the amount of dummy signals to be sent and shorten the overall transmission time.

Still further, according to the present invention, prior to completion of the recording process for image data at the receiving side, a command signal is outputted for instructing to change the reception mode at the receiving side from the image receiving mode to the control signal receiving mode. Therefore, the time necessary for processing the procedure between pages can be shortened, thereby enabling one to shorten the overall transmission time, i.e., the busy time of the network.

As seen from the above description, it is possible to provide an image transmission method and apparatus capable of shortening the overall transmission time and improving the transmission efficiency.

The present invention is not intended to be limited to the above embodiments, but various applications and modifications are possible within the scope of the following claims.

We claim:

1. An image transmission method comprising the steps of:
    obtaining an image signal by reading an original image;
    compression-encoding the obtained image signal;
    temporarily storing the encoded image data in a temporary storage memory;
    receiving, prior to transmission of the encoded data, process time data of a receiving side and a capacity of a buffer memory for temporarily storing the received image data at the receiving side;
    presuming an amount of empty capacity of the buffer memory at the receiving side based on the process time and the capacity of the buffer memory; and
    transmitting the encoded image data in accordance with the presumed empty capacity.

2. An image transmission method according to claim 1, wherein if the presumed empty capacity is equal to or smaller than a predetermined value, a dummy signal is transmitted.

3. An image transmission method according to claim 1, wherein at said presuming step the process time is a minimum tranmission time at the receiving side.

4. An image transmission apparatus comprising:
    reading means for reading an original image to convert the original image into an image signal;
    encoding means for compression-encoding the converted image signal to obtain encoded data;
    storage means for temporarily storing the encoded data;
    transmission means for transmitting the encoded date in said storage means;
    receiving means for receiving, prior to transmission of the encoded data, process time data of a receiving side and storage capacity information of a buffer memory at the receiving side;
    detection means for detecting the amount of data already transmitted by said transmission means but still not processed at the receiving side by presuming the amount of the encoded data processed at the receiving side based on the process time and the storage capacity; and
    control means for controlling said apparatus in such a way that the amount of data still not processed does not exceed the memory capacity of the buffer memory at the receiving side.

5. An image transmission apparatus according to claim 4, wherein the control means controls the transmission means to send a dummy signal when the empty capacity in storage of the buffer memory at the receiving side becomes equal to or smaller than a predetermined value.

6. An image transmission method comprising the steps of:
    obtaining an image signal by reading an original image;
    compression-encoding the obtained image signal;
    transmitting the encoded image data; and
    outputting a command signal after said transmission of the encoded image data by one page and prior to completion of the recording process of the encoded image data at a receiving side, the command signal instructing to change the reception mode of the receiving side from an image receiving mode to a control signal receiving mode.

7. An image transmission method according to claim 6, further comprising the step of presuming the amount of data still not recorded at the receiving side.

8. An image transmission method according to claim 7, wherein at said outputting step the command signal is outputted when the amount of data still not recorded becomes equal to or smaller than a predetermined value.

9. An image transmission method according to claim 6, wherein a control signal is transmitted after sending the command signal.

10. An image transmission method according to claim 9, wherein the control signal is a signal for instructing to change a communication protocol to send the next image signal.

11. An image transmission method according to claim 9, wherein the control signal is a signal for instruction not to change a communication protocol to sent the next image signal.

12. An image transmission method according to claim 9, wherein the control signal is a signal indicating the absence of the next page.

13. An image transmission method comprising the steps of:
    establishing a line to a receiving side;
    obtaining an image signal by reading an original image;
    compression-encoding the image signal;
    temporarily storing the encoded image data in a buffer memory; and
    transmitting the encoded image data from the buffer memory;
    wherein said encoding and storing steps start after establishing the line and prior to completion of pre-procedure at the receiving side.

14. An image transmission method according to claim 13, further comprising the step of deciding a transmission mode, wherein said obtaining, encoding and storing steps start after said decision of the transmission mode.

15. An image transmission method according to claim 14, wherein at said deciding step an encoding method at said encoding step is decided.

16. An image transmission apparatus comprising:
establishing means for establishing a line to a receiving side;
reading means for reading an original image to convert the original image into an image signal;
encoding means for compression-encoding the image signal;
storage means for temporarily storing the image signal encoded by said encoding means;
tranmission means for transmitting the encoded image signal in said storage means and transmitting prior to transmitting the encoded image signal a set signal for setting the receiving side at a reception state;
receiving means for receiving, prior to transmission of the encoded image data, a control signal representative of a completion of pre-procedure at the receiving side; and
control means for starting the operations by said encoding means and said storage means after establishing said line and prior to a reception of the control signal.

17. An apparatus according to claim 16, wherein said encoding means is operable in a plurality of encoding modes and comprises means for determining the encoding mode, and said control means starts the operation by said encoding means after determining operation of said determining means.

* * * * *

UNITED STATES PATENT AND TRADEMARK OFFICE
CERTIFICATE OF CORRECTION

PATENT NO. : 4,719,514

DATED : January 12, 1988

INVENTOR(S) : SADASUKE KURAHAYASHI, ET AL.

It is certified that error appears in the above-identified patent and that said Letters Patent is hereby corrected as shown below:

COLUMN 1

Line 10, "transmission" should read --transmission time--.
Line 25, "1984)" should read --1984--.
Line 26, "herewith" should read --herewith)--.
Line 27, "Fill" should read --fill--.
Line 31, "doing, so" should read --doing so,--.
Line 34, "Fill-bit-less" should read --fill-bit-less--.
Line 59, "membory" should read --memory--.
Line 63, "line" should read --time--.

COLUMN 2

Line 35, "T30 Recommendation" should read --Recommendation T30--.
Line 41,"descrbied" should read --described--.

COLUMN 3

Line 7, "Fill-bit-less" should read --fill-bit-less--.

COLUMN 4

Line 32, "(hereinafter as" should read --(hereinafter abbreviated as--.
Line 58, "in" should read --into--.
Line 58, "into" should read --in--.

UNITED STATES PATENT AND TRADEMARK OFFICE
CERTIFICATE OF CORRECTION

PATENT NO. : 4,719,514

DATED : January 12, 1988

INVENTOR(S) : SADASUKE KURAHAYASHI, ET AL.

It is certified that error appears in the above-identified patent and that said Letters Patent is hereby corrected as shown below:

COLUMN 5

Lines 24-25, "MPU 23.  RAM 9" should read
              --RAM 9.  MPU 23--.
    Line 34, "EP" should read --EP,--.
    Line 36, "EP," should read --EP--.
    Line 47, "pointed" should read --pointer--.
    Line 56, "tranmission" should read --transmission--.

COLUMN 6

Line 36, "aw" should read --as--.
    Line 36, "side too" should read --side, is too--.
    Line 38, "side," should read --side--.

COLUMN 7

Line 1, "St7," should read --ST7,--.
    Line 7, "transmit" should read --transmits--.
    Line 23, "condecutive 0s" should read --consecutive 0s--.
    Line 31, "inserted D" should read --inserted in D--.
    Line 42, "even one byte" should read --one byte of--.
    Line 51, "number" should read --number n--.
    Line 66, ""0138" shoul read --"01"--.
    Line 67, "or reading" should read --of read-out--.

UNITED STATES PATENT AND TRADEMARK OFFICE
CERTIFICATE OF CORRECTION

PATENT NO. : 4,719,514

DATED : January 12, 1988

INVENTOR(S) : SADASUKE KURAHAYASHI, ET AL.

It is certified that error appears in the above-identified patent and that said Letters Patent is hereby corrected as shown below:

COLUMN 8

Line 12, "a ST10," should read --at ST10,--.
Line 46, "reached" should read --reaches--.
Line 51, "fill bets" should read --fill bits--.
Line 54, "not still" should read --still not--.
Line 62, "is" should read --if--.
Line 64, "not still" should read --still not--.

COLUMN 9

Line 11, "addres" should read --address--.
Line 51, "SP40." should read --SP'.--.
Line 63, "step SP'" should read --step ST'--.
Line 65, "it" should read --It--.

COLUMN 10

Line 53, "end encoded" should read --and encode--.

COLUMN 11

Line 1, "in case of absence," should read --in the case of absence of another page,--.
Line 59, "terminated" should read --terminate--.
Line 62, "not still" should read --still not--.
Line 67, "not still" should read --still not--.

UNITED STATES PATENT AND TRADEMARK OFFICE
CERTIFICATE OF CORRECTION

PATENT NO. : 4,719,514
DATED : January 12, 1988
INVENTOR(S) : SADASUKE KURAHAYASHI, ET AL.

It is certified that error appears in the above-identified patent and that said Letters Patent is hereby corrected as shown below:

COLUMN 12

Line 3, "not still" should read --still not--.
    Line 17, "(1 set±15%" should read --(1 sec±15%--.
    Line 30, "is" should read --as--.
    Line 59, "When" should read --With--.

COLUMN 13

Line 8, "preprocedure" should read --pre-procedure--.
    Line 57, "tranmission" should read --transmission--.

COLUMN 14

Line 49, "sent" should read --send--.

COLUMN 15

Line 16, "tranmission" should read --transmission--.

Signed and Sealed this

Thirtieth Day of May, 1989

Attest:

DONALD J. QUIGG

Attesting Officer

Commissioner of Patents and Trademarks